United States Patent [19]
Takiguchi

[11] Patent Number: 5,928,108
[45] Date of Patent: Jul. 27, 1999

[54] AUTOMATIC TRANSMISSION WORKING FLUID PRESSURE CONTROL APPARATUS

[75] Inventor: Masahiro Takiguchi, Shizuoka, Japan

[73] Assignee: Jatco Corporation, Fuji, Japan

[21] Appl. No.: 08/985,017

[22] Filed: Dec. 4, 1997

[30] Foreign Application Priority Data

Dec. 12, 1996 [JP] Japan .................................. 8-332326

[51] Int. Cl.⁶ .................................................. F16H 61/04
[52] U.S. Cl. ............................................ 477/98; 475/117
[58] Field of Search ...................... 477/97, 98; 475/116, 475/117; 74/606 R

[56] References Cited

U.S. PATENT DOCUMENTS

| | | | |
|---|---|---|---|
| 5,127,287 | 7/1992 | Taniguchi et al. | 74/606 R |
| 5,129,422 | 7/1992 | Davison, Jr. et al. | 74/606 R |
| 5,327,800 | 7/1994 | Van Selous | 475/116 |
| 5,622,088 | 4/1997 | Reid | 74/606 R |

FOREIGN PATENT DOCUMENTS 61-133150  8/1986  Japan .

*Primary Examiner*—Dirk Wright
*Attorney, Agent, or Firm*—Foley & Lardner

[57] ABSTRACT

A fluid pressure control apparatus for use with an automatic transmission having a hydraulic circuit connected to supply a fluid pressure so as to operate selected ones of friction elements in the engaged position and release the fluid pressure so as to operate selected ones of the friction elements in the disengaged positions. The control apparatus controls the fluid pressure to the friction elements according to a shift from a current gear position to a target gear position. The fluid pressure is applied temporarily to disengaged ones of the friction elements so as to exhaust air from the hydraulic circuit.

30 Claims, 12 Drawing Sheets

FIG.2

| | | R/C | H/C | F/C | O/C | BAND SERVO | | | F/O.C | L/O.C | L&R/B | NOTE |
|---|---|---|---|---|---|---|---|---|---|---|---|---|
| P | | | | ○ | | | | | | | | PARK |
| R | | ○ | | | | | | | | | ○ | REVERSE |
| N | | | | | | | | | | | | NEUTRAL |
| D | 1st | | | ○ | | | | | ● | | | AUTO SHIFT 1⇔2⇔3⇔4 |
| | 2nd | | | ○ | ⊗ | | | ○ | ● | | | |
| | 3rd | | ○ | ○ | ○ | | | ⊗ | ● | | | |
| | 4th | | ○ | ⊗ | ○ | | ○ | ⊗ | | | | |
| 2 | 1st | | | ○ | ⊗ | | | | ● | ● | | AUTO SHIFT 1⇔2 |
| | 2nd | | | ○ | ○ | | | ○ | ● | | | |
| 1 | 1st | | | ○ | ○ | | | ○ | ● | | ○ | 1st FIXED 1⇔2 |
| | 2nd | | | ○ | ○ | | | ○ | ● | | | |

| GEAR POSITION \ SOLENOID | 1st SHIFT SOLENOID | 2nd SHIFT SOLENOID |
|---|---|---|
| 1st | ○ | ○ |
| 2nd | × | ○ |
| 3rd | × | × |
| 4th | ○ | × | ns
AUTOMATIC TRANSMISSION WORKING FLUID PRESSURE CONTROL APPARATUS

BACKGROUND OF THE INVENTION

This invention relates to an automatic transmission working fluid pressure control apparatus for controlling fluid pressure to operate friction elements used in an automatic transmission.

For example, Japanese Utility Model Kokai No. 61-133150 discloses an automatic transmission line pressure control apparatus arranged to ensure smooth clutch operation at very low temperatures by increasing the line pressure at its maximum value at low temperatures. If air bubbles are collected in the hydraulic circuit (fluid pressure passages), however, the time required to feed the working fluid to the clutch will increase, causing clutch operation lag, unstable fluid pressure and unstable hydraulic response. Particularly during the first gear shift effected after the engine of an automotive vehicle left alone for a long time is started, air bubbles will collect in the control valve case and the clutches to prevent the fluid pressure from rising at a rapid rate so as to cause various defects as shown in FIG. 13. The numeral ① indicates an engine over-revolution which occurs in connection with a high-speed shift such as a 1–2 gear shift. The numeral ② indicates a drop in the output shaft torque. The numeral ③ indicates engine racing which occurs particularly during a gear shift without the use of a one-way clutch. The tendency toward these defects increases as the oil temperature decreases.

Also during the 2nd and subsequent gear shifts, the collected air bubbles will degrade the fluid pressure response to cause defects as follows: The numeral ④ indicates that the fluid pressure rises at a slow rate and the numeral ⑤ indicates that the fluid pressure rises at a very slow rate.

SUMMARY OF THE INVENTION

It is a main object of the invention to provide a fluid pressure control apparatus for use with an automatic transmission which can exhaust air bubbles from the hydraulic circuit to operate the automatic transmission without friction element operation lag, unstable fluid pressure and degraded fluid pressure response.

There is provided, in accordance with the invention, a fluid pressure control apparatus for use with an automotive vehicle including and engine and an automatic transmission having a casing, a plurality of first fiction elements operable between engaged and disengaged positions on pressures of working fluid applied thereto, each of the first friction elements having two rotary members engaged with each other in the engaged position, a plurality of second friction elements operable between engaged and disengaged positions on working fluid pressures applied thereto, each of the second friction elements having a rotary member fixed with the casing in the engaged position, and a hydraulic circuit connected to apply working fluid pressures so as to operate selected ones of the friction elements in the engaged position and release the working fluid pressure so as to operate selected ones of the friction elements in the disengaged position. The fluid pressure control apparatus comprises a control unit for controlling the working fluid pressures to the respective friction elements according to a shift from a current gear position to a target gear position, and air exhaust control means for applying the working fluid pressures temporarily to disengaged ones of the friction elements to exhaust air from the hydraulic circuit.

BRIEF DESCRIPTION OF THE DRAWING

This invention will be described in greater detail. by reference to the following description taken in connection with the accompanying drawings, in which:

FIG. 2 is a table used in explaining the engaged and disengaged states of the friction elements illustrated in FIG. 2 to effect various gear ratio changes;

DETAILED DESCRIPTION OF THE INVENTION

Figure 1:
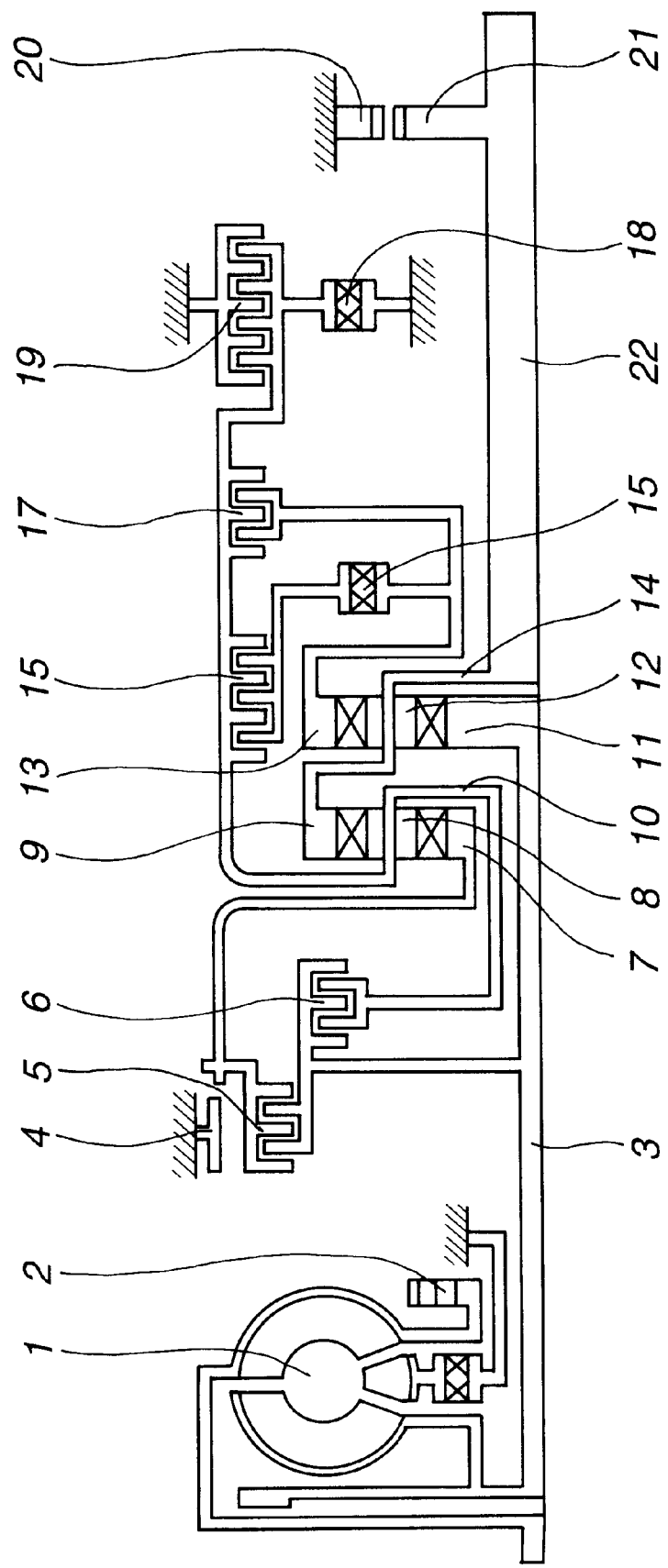
FIG. 1 is a schematic block diagram showing a gear train used in an automatic transmission to which the invention is applicable.

With reference to the drawings and in particular to FIG. 1, there is shown a schematic diagram of a fluid pressure control apparatus made in accordance with the invention. The fluid pressure control apparatus is intended for use with an automatic transmission having a number of friction (torque transmitting) elements, operable on fluid pressure, including a pair of planetary gear units, four pairs of multi-plate clutches, a band brake and a pair of multi-plate brakes. In FIG. 1, the numeral 1 designates a torque converter, the numeral 2 designates an oil pump, the numeral 3 designates an input shaft, the numeral 4 designates a band brake, the numeral 5 designates a reverse clutch, the numeral 6 designates a high clutch, the numeral 7 designates a front sun gear, the numeral 8 designates a front pinion, the numeral 9 designates a front ring gear, the numeral 10 designates a front carrier, the numeral 11 designates a rear sun gear, the numeral 12 designates a rear pinion, the numeral 13 designates a rear ring gear, the numeral 14 designates a rear carrier, the numeral 15 designates a forward clutch, the numeral 16 designate a forward one-way clutch, the numeral 17 designates an overrun clutch, the numeral 18 designates a low one-way clutch, the numeral 19 designates a low & reverse brake, the numeral 20 designates a parking pole, the numeral 21 designates a parking gear, and the numeral 22 designates an output shaft.

Figure 3:
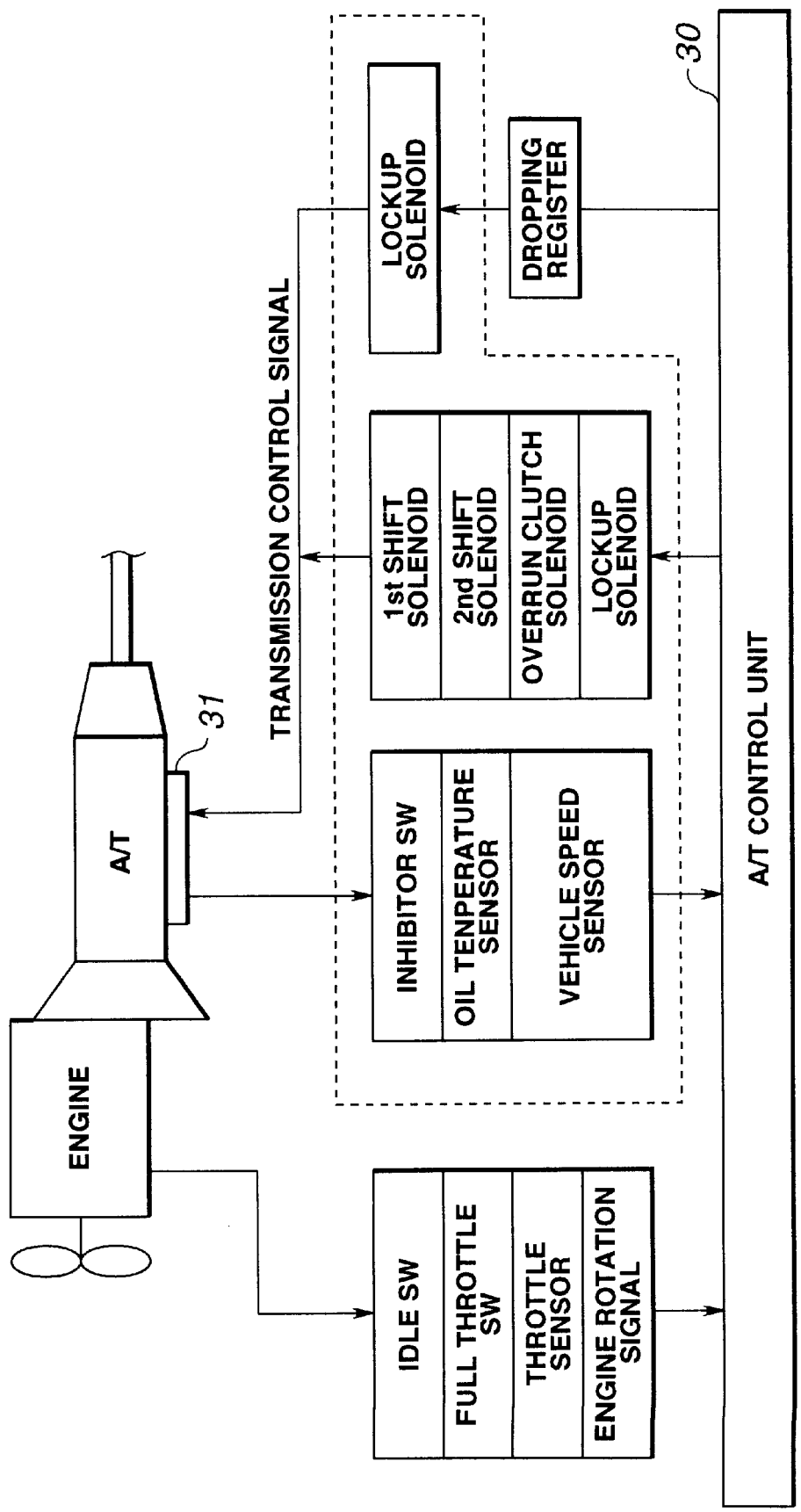
FIG. 3 is a schematic diagram showing an automatic transmission control system to which the invention is applicable.

Each of the friction elements including the four pairs of multi-plate clutches, the band brake, the one pair of multi-plate brakes and the two pairs of one-way clutches is switched between its engaged and disengaged states, as shown in FIG. 2, to provide four forward speeds in the drive (D), reverse (R), 2nd speed (2) and 1st speed (1) ranges. In FIG. 3, the character R/C designates the reverse clutch 5, the character H/C designates the high clutch 6, the character F/C designates the forward clutch 15, the character O/C designates the overrun clutcn 17, the character F/O · C designates the forward one-way clutch, the character L/O · C designates the low one-way clutch 18 and the character L&R/B designates the low & reverse brake 19. The band servo is a hydraulic servo of the band brake 4. The character ○ indicates that the corresponding friction element is engaged or that the corresponding friction element is engaged when the degree to which the accelerator pedal is depressed is equal to or less than a predetermined value, the character ● indicates that the corresponding friction element operates during acceleration, and the character ○ designates that the corresponding friction element is engaged, but does not contribute to torque transmission or that the corresponding friction element is engaged when the degree to the accelerator is depressed is equal to or less than a predetermined value, but does not contribute to engine brake. The character *1 indicates that the corresponding friction element operates only when the OD switch is OFF (any shift to $D_4$ is inhibited), the character *2 indicates that although fluid pressure is applied to both of the 2nd and 3rd speed apply sides of the band servo piston, the brake band is not engaged because of a great area of the release side to which the fluid pressure is applied, and the character *3 indicates that the brake band is engaged since the fluid pressure is applied to the 4th apply side under the condition *2.

Figure 4:
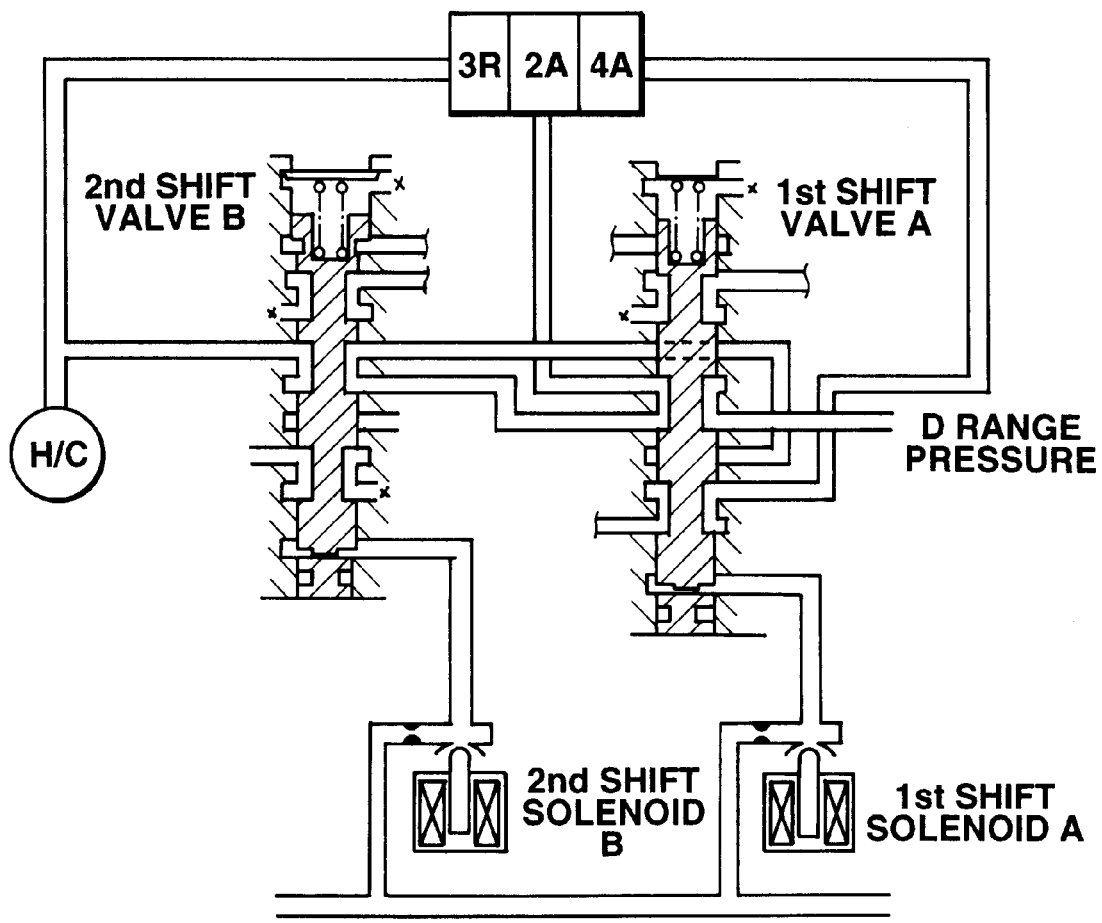
FIG. 4 is a schematic diagram showing a hydraulic circuit used in the automatic transmission.
Figures 5, 6:
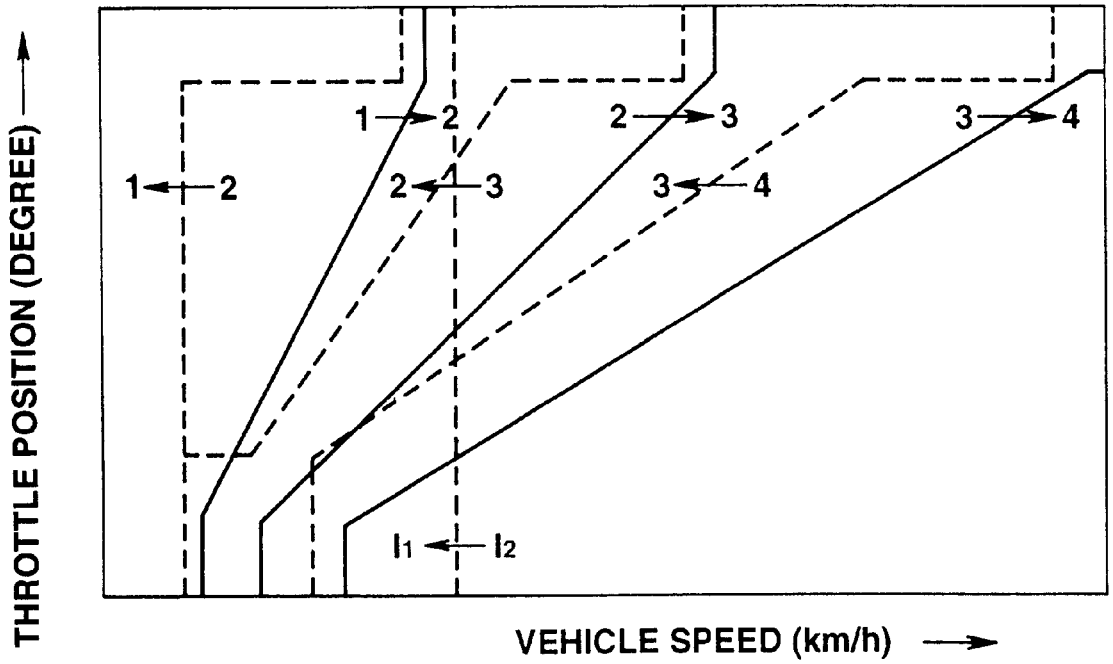
FIG. 5 is a diagram showing a shift schedule used for a shift control made in the A/T control unit of FIG. 3.
FIG. 6 is a table used in explaining the ON and OFF states of the first and second shift solenoids illustrated in FIG. 4 to effect various gear ratio changes.

Referring to FIG. 3, there is shown an automatic transmission control system to which the invention is applied. The control system includes a digital computer programmed to perform various controls including shift, line-pressure, lockup and engine-brake controls based on various conditions of the engine and automatic transmission that are sensed during their operation. In FIG. 3, the numeral 30 designates an automatic transmission (A/T) control unit and the numeral 31 designates a valve unit including control actuators and valves provided in a hydraulic circuit connected to the friction elements, as shown in FIG. 4. The shift solenoids A and B are shift control actuators, the line pressure solenoid is a line pressure control actuator, the lockup solenoid is a lockup control actuator and an overrun clutch solenoid is an engine brake control actuator. The A/T control unit 30 controls the actuators, that is, the first shift solenoid A, the second shift solenoid B, the overrun clutch solenoid, the low clutch timing solenoid and the line pressure solenoid, to make a gear shift in the automatic transmission A/T. The A/T control unit 30 effects a gear shift based upon existing gear position, vehicle speed, oil temperature and engine operating conditions. Thus, an inhibitor switch, an oil temperature sensor, a vehicle speed sensor, an idle switch, a full-throttle switch, a throttle sensor and an engine speed sensor are connected to the A/T control unit 30. In the illustrated embodiment, the A/T control unit 30 is arranged to make an automatic gear shift control to effect gear shifts by switching ON and OFF states of the first and second shift solenoids A and B. For this purpose, the A/T control unit 30 employs a shift schedule table, as shown in FIG. 5, to produce an up shift command when the operation point represented by throttle valve position and vehicle speed crosses one of the upshift lines, as indicated by the solid lines of FIG. 5, and a downshift command when the operation point crosses one of the downshift lines, as indicated by the broken lines of FIG. 5. The A/T control unit 30 switches the first and second shift solenoids A and B, as shown in FIG. 6, to effect a change to the gear position determined by the upshift or downshift command. In FIG. 6, the character ○ indicates that the corresponding shift solenoid is at its ON position closing the drain circuit, and the character X indicates that the corresponding shift solenoid is at its OFF position opening the drain circuit. The A/T control unit 30 is also programmed to temporarily apply a fluid pressure to disengaged ones of the friction elements so as to exhaust air bubbles from the hydraulic circuit.

The A/T control unit 30 employs a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signal into corresponding digital signals for application to the central processing unit. The read only memory contains the programs for operating the central processing unit and further contains appropriate data in look-up tables used for gear shift control.

Figure 7:
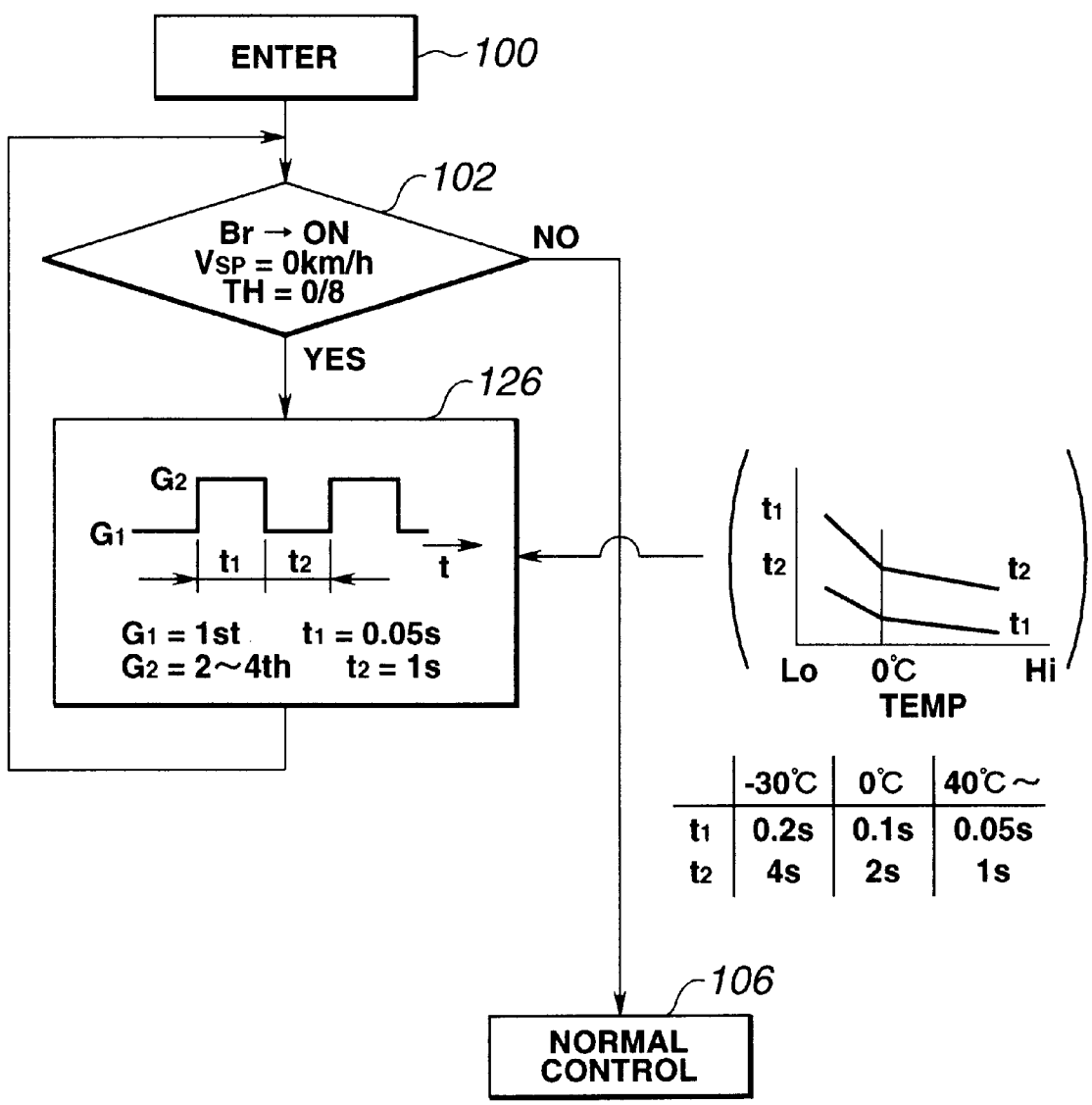
FIG. 7 is a flow diagram illustrating the programming of the digital computer as it is used for an air exhaust control performed when the vehicle is at rest.

FIG. 7 is a flow diagram illustrating the programming of the digital computer as it is used to exhaust air bubble from the hydraulic circuit (air exhaust control). The computer program is entered at the point 100 upon selection of one of the neutral (N), drive (D), 1st (1) and 2nd (2) ranges. At the point 102 in the program, a determination is made as to whether or not the vehicle is at rest. The answer to this question is "YES" when three conditions are fulfilled, that is, when the brake Br is depressed (ON), the vehicle speed $V_{sp}$ is equal to 0 km/h and the throttle position TH is at an angle of 0/8 and the program proceeds to the point 104 where an air exhaust control is made by repeating a charging operation of changing the gear ratio G from the first gear position G1 to another higher gear (2nd, 3rd or 4th gear) position G2 and thereafter in a moment t1 changing from the higher gear position G2 to the first gear position G1 at intervals of a predetermined time t2 (for example, 1 second), as indicated by the block 104. Following this, the program is returned to the point 102. If the vehicle is not at rest, then the program proceeds from the point 102 to the point 106 where the gear shift control is made in a normal mode without the air exhaust control.

The moment t1 is set at a time (for example, 0.05 seconds) shorter than the time required for the stroke of the piston of the clutch at a desired fluid pressure. The time t2 is set at a time (for example, 2 seconds) sufficient for the clutch piston to return to its initial position if the piston moves. Preferably, each of the times t1 and t2 is set at a smaller value as the oil temperature increases. For example, the times t1 and t2 are 0.2 seconds and 4 seconds, respectively, when the oil temperature is −30° C., 0.1 seconds and 2 seconds, respectively, when the oil temperature is 0° C., and 0.05 seconds and 1 second, respectively, when the oil temperature is 40° C. Preferably, the times t1 and t2 are set according to the number of times gear shifts are effected after the engine starts.

Preferably, the higher gear position G2 to which a change is made from the 1st gear position G2 during the air exhaust control is the 3rd gear position when the hydraulic circuit to the high clutch H/C is charged, the 2nd gear position when the 2nd apply pressure of the band brake is charged, and the 4th gear position when both of the band brake and the high clutch H/C are charged since the automatic transmission is of the shift valve type. During the charging operation repeated for the air exhaust control, the order of change of the gear position may be 3rd, 2nd and 4th gear positions or 2nd, 3rd and 4th gear positions according to the order of increase of the fluid pressure or the number of times the air exhaust control has been made. If the automatic transmission is of the direct-acting valve type, the air exhaust control may be made by moving the valves for the respective clutches.

Figure 8:
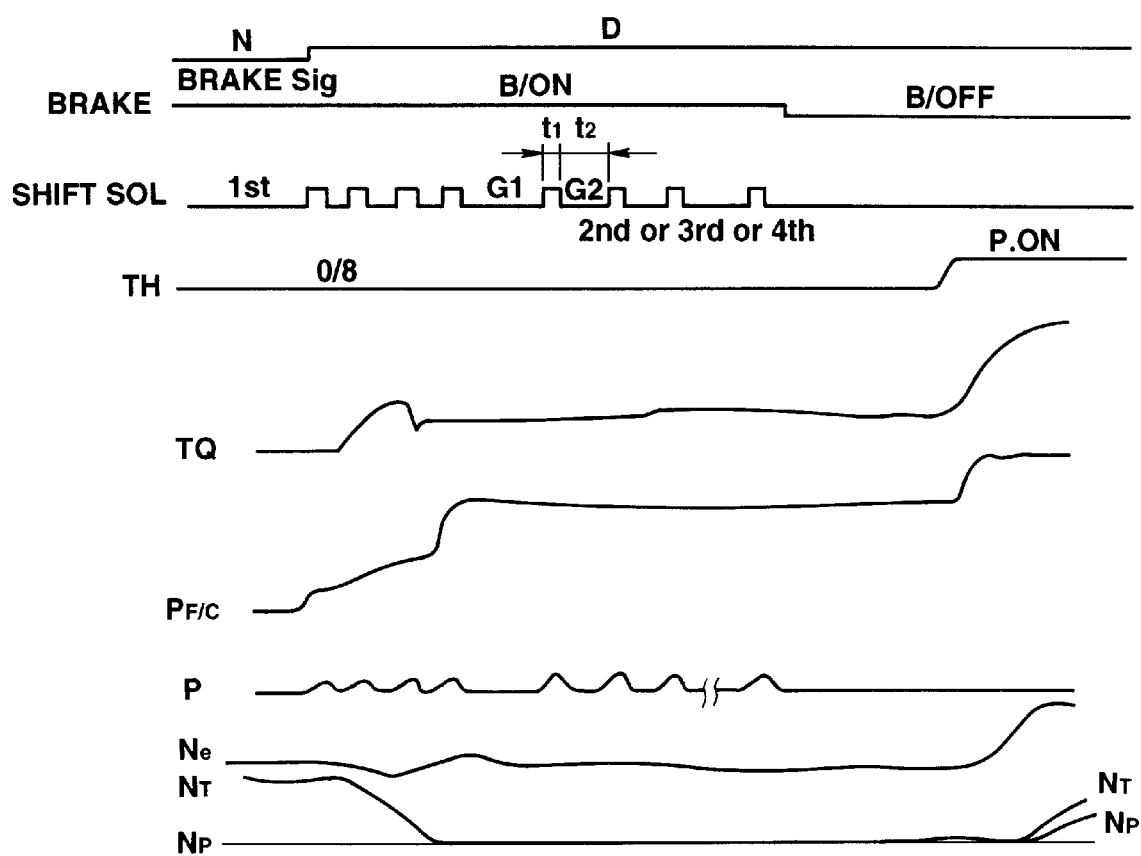
FIG. 8 contains graphs showing the transient characteristics of various conditions during the air exhaust control of FIG. 7.

When the D range is selected and the vehicle is at rest, that is, the brake Br is depressed (ON), the vehicle speed $V_{sp}$ is equal to 0 km/h and the throttle position TH is at an angle of 0/8 the brake is ON, a charging operation of changing the gear ratio G from the first gear position G1 to another higher gear (2nd, 3rd or 4th gear) position G2 and thereafter in a moment t1 changing from the higher gear position G2 to the first gear position G1 is repeated at intervals of a predetermined time t2 to exhaust air bubbles from the hydraulic circuit without stroking the pistons of the clutch and brakes, as shown in FIG. 8. The reason why repetitive momentary increases of the fluid pressure P to a disengaged friction element (for example, clutch) can exhaust air bubbles from the hydraulic circuit is that a long time is required for air to enter the hydraulic circuit after it is exhausted by a temporarily increase of the fluid pressure in the hydraulic circuit since the rate at which the fluid pressure increases in the hydraulic circuit is greater than the rate at which the fluid pressure decreases in the hydraulic circuit.

The above described fluid pressure control apparatus provides the following development advantages:

(1) When it is judged that the vehicle is at rest, an operation of changing the gear ratio G from the first gear position G1 to another higher gear position G2 and thereafter in a moment t1 changing from the higher gear position G2 to the first gear position G1 is repeated at intervals of a predetermined time t2 to exhaust air bubbles from the hydraulic circuit. Therefore, the automatic transmission can operate without friction element operation lag, unstable fluid pressure and unstable fluid pressure response which may result from air bubbles collected in the hydraulic circuit.

(2) The fluid pressure control apparatus is arranged to exhaust air bubbles from the hydraulic circuit by operating the shift valve(s) so as to effect a temporary shift to another higher gear position for temporary application of a fluid pressure to the disengaged friction element(s). Therefore, the air exhaust control program can be built in the shift control program with the common use of the control actuators (shift valves).

(3) The air exhaust control is performed when it is judged that the vehicle is at rest, no change (for example, shocks) occurs in the behavior of the vehicle even though the clutch trails.

(4) The moment t1 is set at a value shorter than the time required for one clutch piston stroke under a desired fluid pressure and the time t2 is set at a value in which the clutch piston can be returned to its initial position even though the clutch piston modes. It is, therefore, possible to exhaust air from the hydraulic circuit without stroking the piston.

(5) Each of the times t1 and t2 is set at a value increasing as the oil temperature decreases, that is, according to the viscosity of the working fluid (oil). It is, therefore, possible to exhaust air from the hydraulic circuit smoothly at low temperatures.

Figure 9:
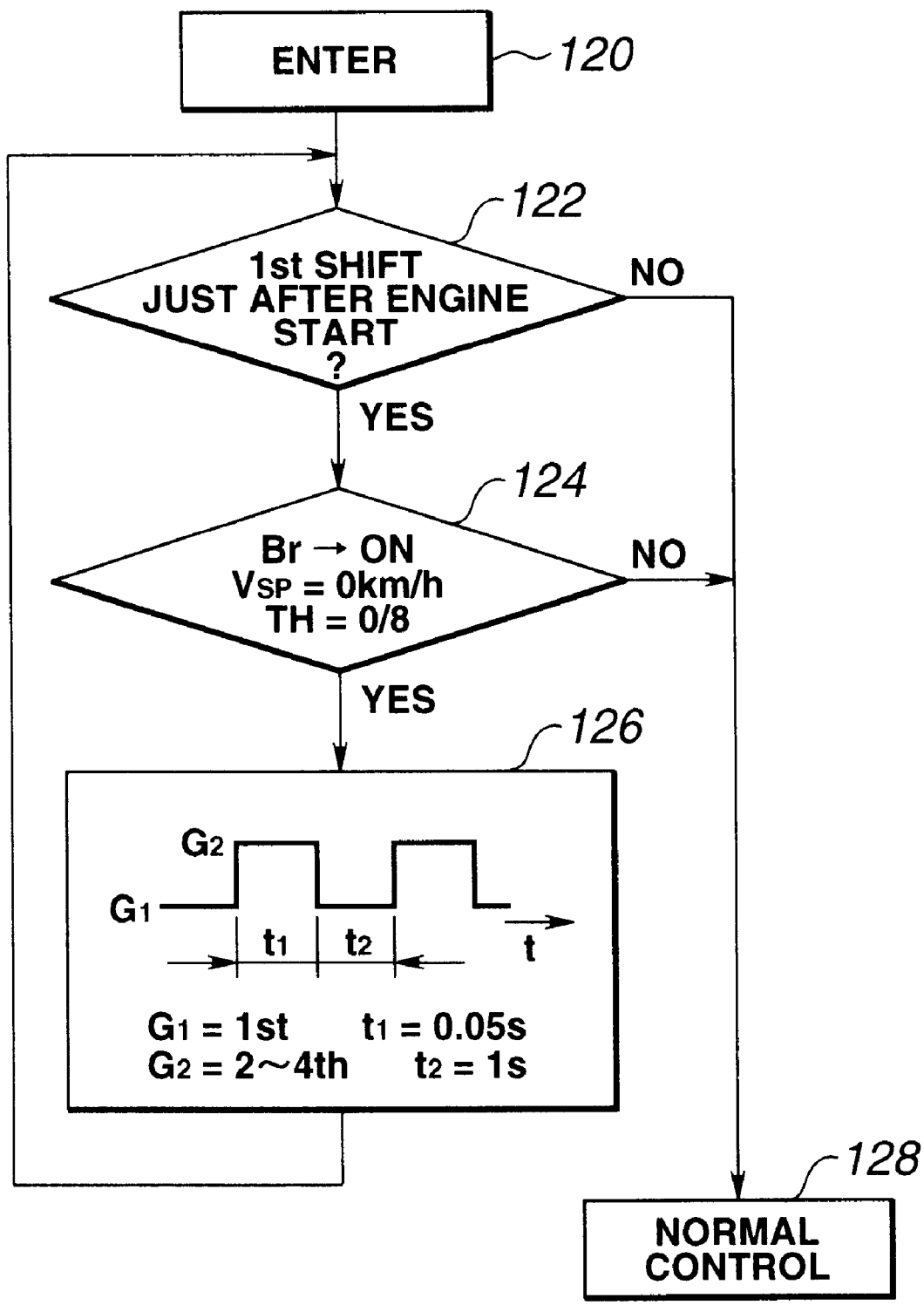
FIG. 9 is a flow diagram showing a modified form of the programming of the digital computer as it is used for an air exhaust control performed before the first shift effected after the engine starts.

Referring to FIG. 9, there is shown a modified form of the programming of the digital computer as it is used to exhaust air bubble from the hydraulic circuit (air exhaust control). This modification is substantially the same as the program as described in connection with FIG. 7 except that the air exhaust control is allowed only before the first shift effected after the engine starts. The computer program is entered at the point 120 upon selection of one of the neutral (N), drive (D), 1st (1) and 2nd (2) ranges. At the point 122 in the program, a determination is made as to whether or not no shift has been effected after the engine starts. If the answer to this question is "YES", then the program proceeds to the point 124. Otherwise, the program proceeds to the point 128. At the point 124, a determination is made as to whether or not the vehicle is at rest. The answer to this question is "YES" when three conditions are fulfilled, that is, when the brake Br is depressed (ON), the vehicle speed $V_{sp}$ is equal to 0 km/h and the throttle position TH is at an angle of 0/8 and the program proceeds to the point 126 where an air exhaust control is made by repeating a charging operation of changing the gear ratio G from the first gear position G1 to another higher gear (2nd, 3rd or 4th gear) position G2 and thereafter in a moment t1 changing from the higher gear position G2 to the first gear position G1 at intervals of a predetermined time t2 (for example, 1 second), as indicated by the block 126. Following this, the program is returned to the point 122. If the vehicle is not at rest, then the program proceeds from the point 124 to the point 128 where the gear shift control is made in a normal mode without the air exhaust control.

This modification provides an additional advantage as follows:

(6) The air exhaust control is performed before the first shift effected after the engine starts. This is effective to exhaust the air bubbles collected while the vehicle is left alone.

Although the invention has been described in connection with an air exhaust control performed when the vehicle is at rest, it is to be understood that the invention may be modified to perform the air exhaust control when no shift is effected while the vehicle is running. In this modification, the determination made at the point 102 of FIG. 7 or at the point 124 of FIG. 9 is eliminated and replaced therefor with a determination as to whether or not no shift is effected while the vehicle is running. If the answer to this question is "YES", then the program proceeds to the air exhaust control step at the point 104 of FIG. 7 or at the point 126 of FIG. 9. Otherwise, the program proceeds to the normal control step at the point 106 of FIG. 7 or at the point 128 of FIG. 9.

Figure 10:
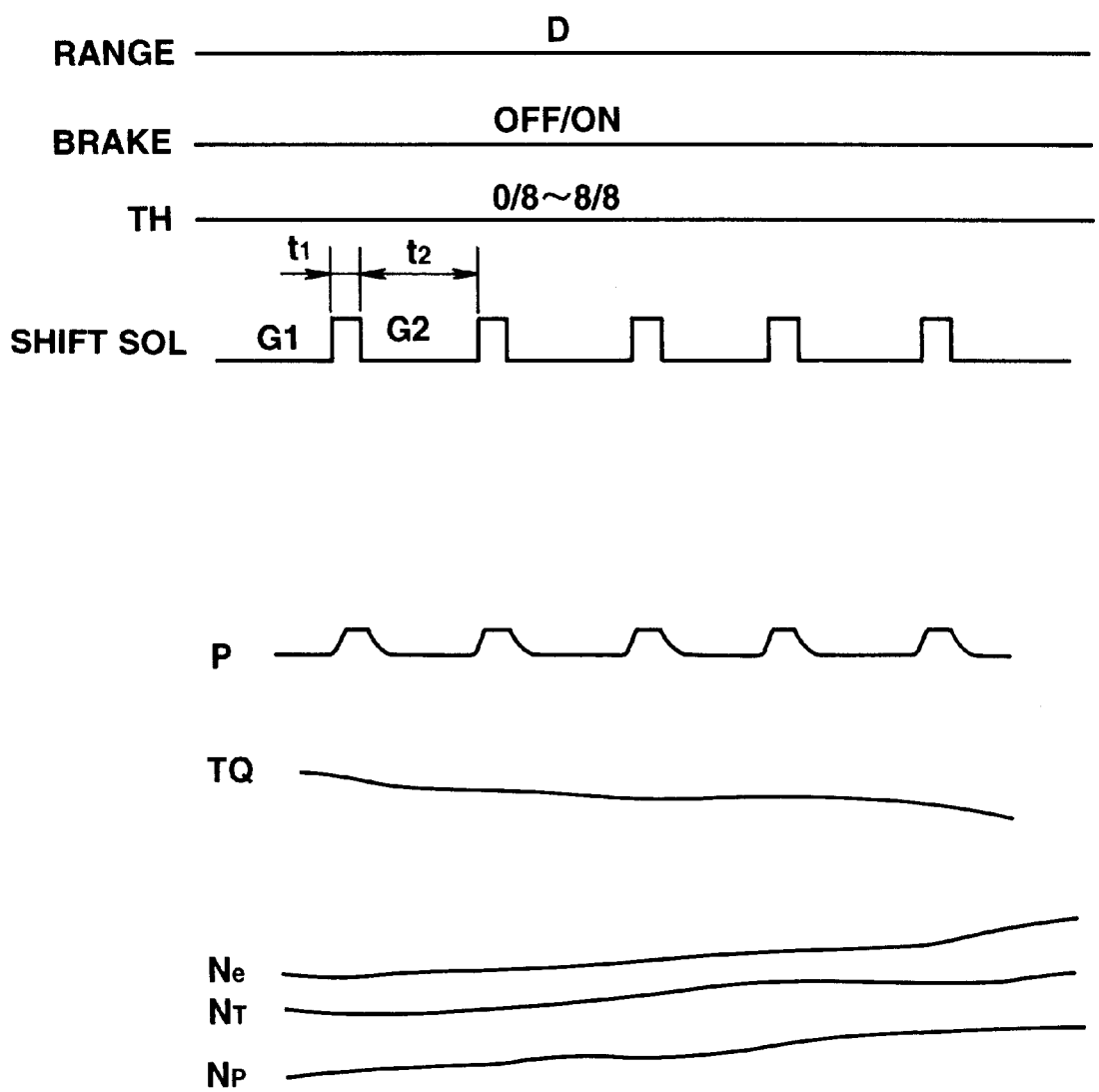
FIG. 10 contains graphs showing the transient characteristics of various conditions during the air exhaust control of FIG. 9.

When the D range is selected and the vehicle is running with no gear shift operation, a charging operation of changing the gear ratio G from the first gear position G1 to another higher gear (2nd, 3rd or 4th gear) position G2 and thereafter in a moment t1 changing from the higher gear position G2 to the first gear position G1 is repeated at intervals of a predetermined time t2 to exhaust air bubbles from the hydraulic circuit, as shown in FIG. 10.

This modification provides an additional advantage as follows:

(7) Since the air exhaust control is performed when the vehicle is running with no gear shift operation, the control time can be elongated as compared to that permitted for the air exhaust control performed when the engine is at rest. Since the air exhaust control is performed before the first gear shift, it is possible to achieve a stable air exhaust operation.

Figure 11:
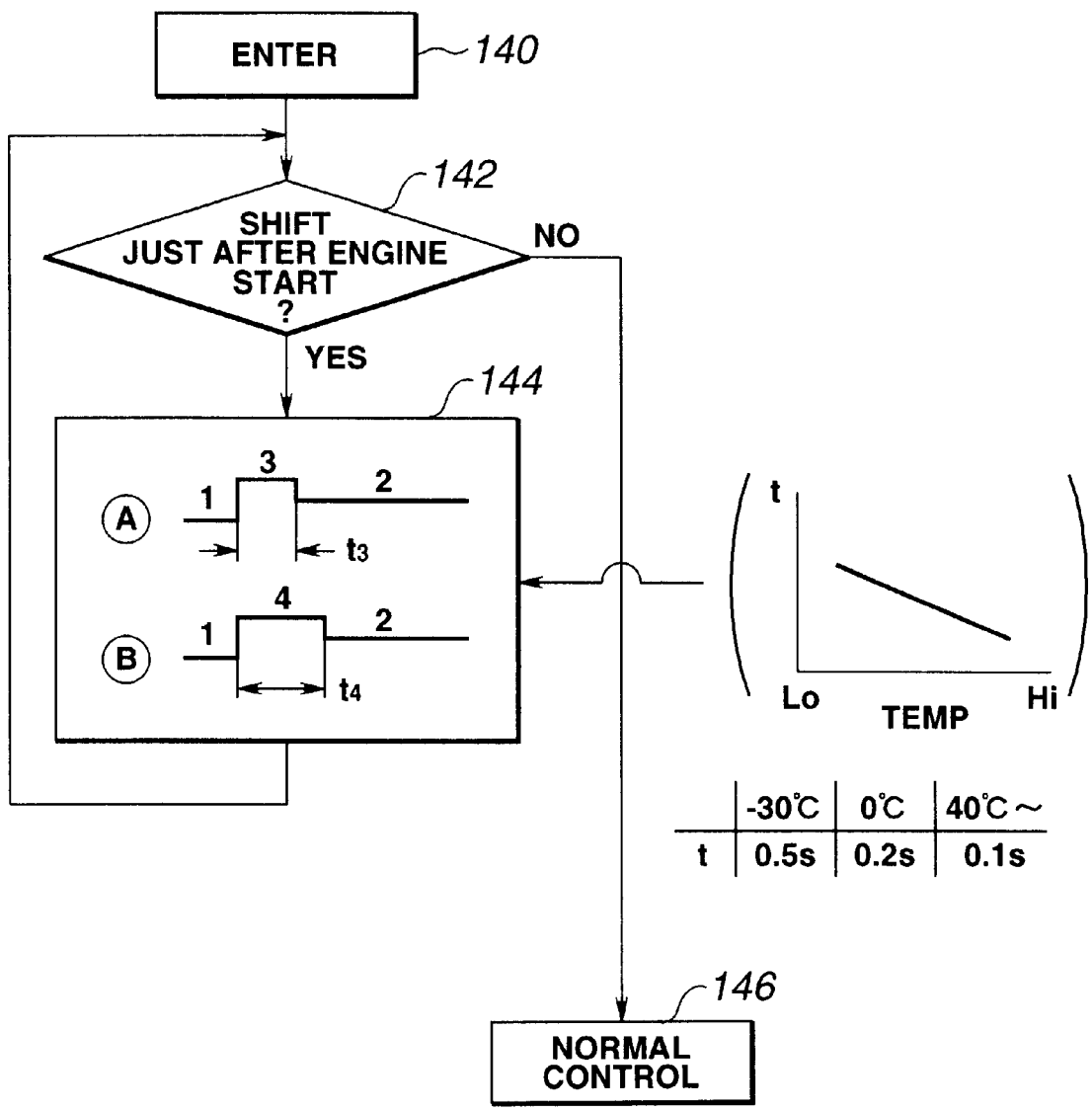
FIG. 11 is a flow diagram showing another modified form of the programming of the digital computer as it is used for an air exhaust control performed when a shift is commanded.

Referring to FIG. 11, there is shown another modified form of the programming of the digital computer as it is used to exhaust air bubble from the hydraulic circuit (air exhaust control). The computer program is entered at the point 140 when c. gear shift is commanded. At the point 142 in the program, a determination is made as to whether or not the gear shift is commanded just after the engine starts. If the answer to this question is "YES", then it means that the gear shift is the first or second gear shift commanded after the engine starts and the program proceeds to the point 144 where an air exhaust control is made by repeating a charging operation of changing the gear ratio G from the first gear position G1 to another higher gear (3rd or 4th gear) position G3 or G4 and thereafter in a moment t changing from the higher gear position C3 or G4 to another gear (2nd gear) position G2 at intervals of a predetermined time, as indicated by the block 144. Following this, the program is returned to the point 142. If the answer to the question inputted at the point 142 is "NO", then the program proceeds to the point 146 where the gear shift control is made in a normal mode without the air exhaust control.

The moment t (t3, t4) may set at a smaller value as the oil temperature increases. For example, the moment t is 0.5 seconds when the oil temperature is –30° C., 0.2 seconds when the oil temperature is 0° C., and 0.1 seconds when the oil temperature is 40° C. Preferably, the moment t may be changed according to the number of times a gear shift is effected after the engine starts. The higher gear position to which a change is made from the 1st gear position G1 during the air exhaust control is the 3rd gear position G3 when the hydraulic circuit to the high clutch H/C is charged (type A) and the 4th gear position G4 when both of the band brake and the high clutch H/C are charged (type B). Even though the disengaged clutch has a torque capacity to degrade the shift quality during the air exhaust control, it is inconspicuous since the fluid pressure application is made at the same time when the gear shift is effected.

Figure 12A:
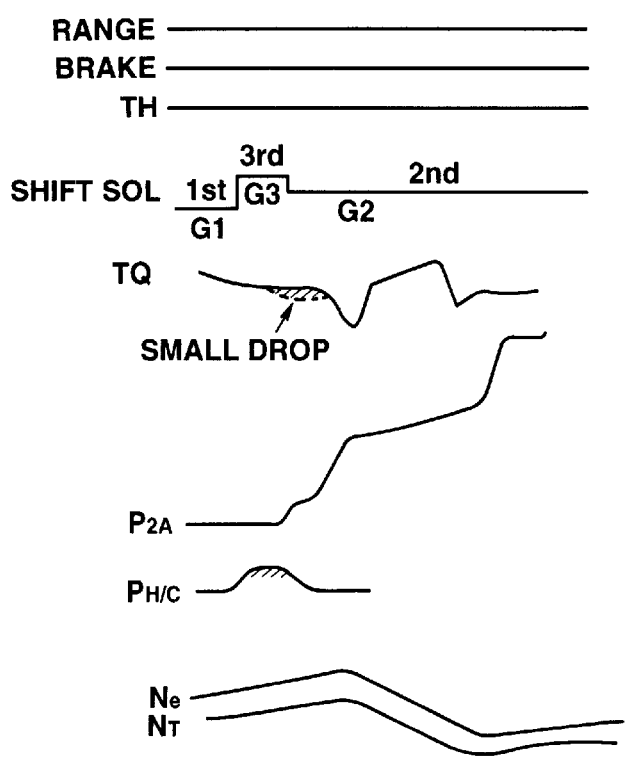
FIG. 12A contains graphs showing the transient characteristics of various conditions during the A type air exhaust control of FIG. 11.
Figure 12B:
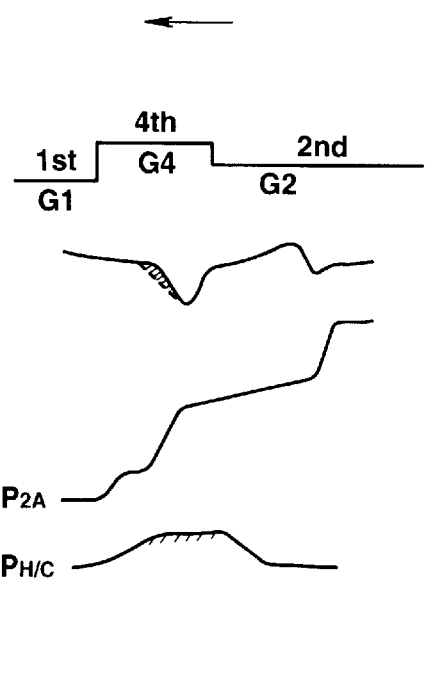
FIG. 12B contains graphs showing the transient characteristics of various conditions during the B type air exhaust control of FIG. 11.
Figure 13:
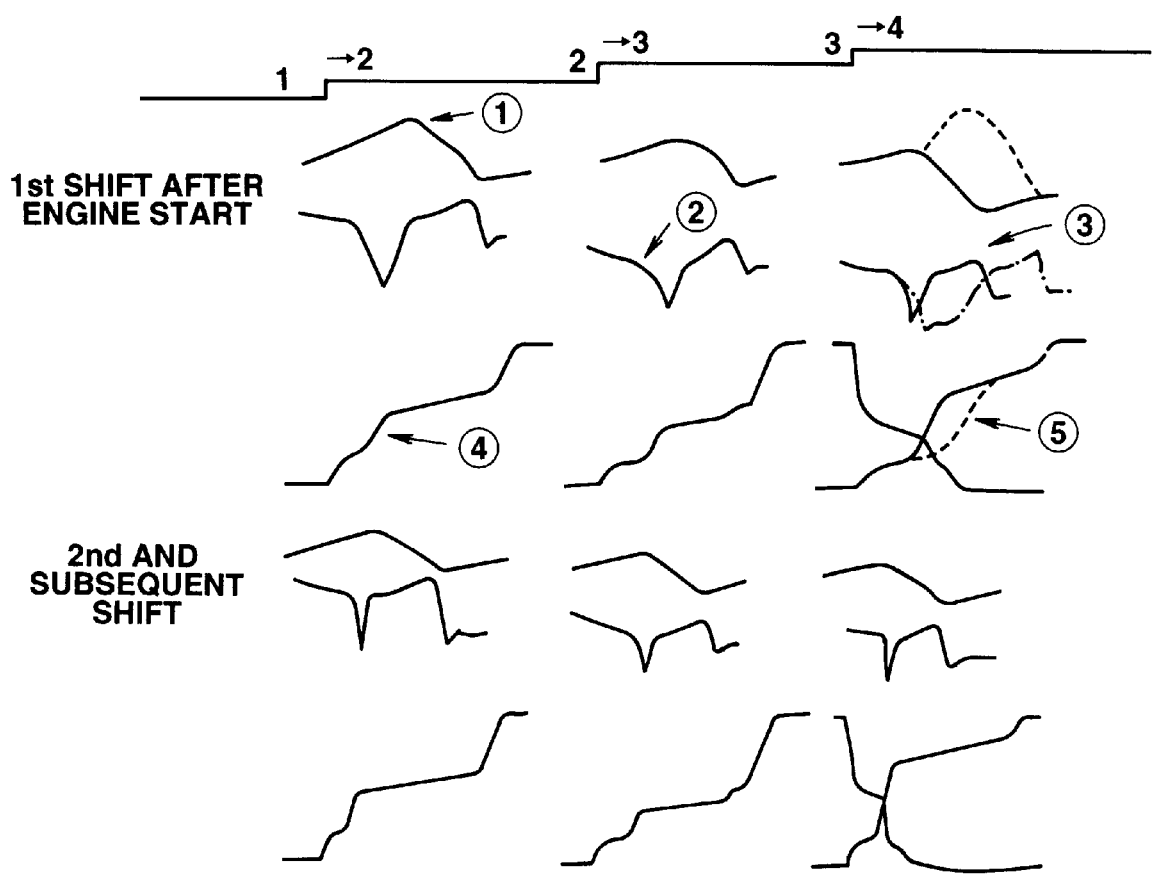
FIG. 13 contains graphs used in explaining the defects associated with the conventional fluid pressure control apparatus.

FIG. 12A shows the transient conditions of various parameters during an air exhaust control (A type) made by changing the gear position G from the first gear position G1 to the 3rd gear position G3 where the high clutch H/C is engaged when a gear shift is effected. FIG. 12B shows the transient conditions of various parameters during an air exhaust control (B type) made by changing the gear position G from the first gear position G1 to the 4th gear position G4 where both of the band brake and high clutch are engaged. As can be seen from FIGS. 12A and 12B, the output shaft torque drops to some extent in either case when the high clutch H/C is engaged. However, such a torque drop have almost no effect on the shift quality.

This modification provides an additional advantage as follows:

(8) Although the shift quality is degraded to some extent during an air exhaust control, the produced shock will be inconspicuous since it is overlapped with the main gear sift operation.

Although the invention has been described in connection with an air exhaust control performed by moving the shift valves to exhaust air bubbles from the hydraulic circuit, it is to be understood that the invention is also applicable to such a direct-acting type automatic transmission as disclosed in Japanese Patent Kokai No. 7-269685.

The invention is directed to a fluid pressure control apparatus for use with an automotive vehicle including and engine and an automatic transmission having a casing, a plurality of first fiction elements operable between engaged and disengaged positions on pressures of working fluid applied thereto, each of the first friction elements having two rotary members engaged with each other in the engaged position, a plurality of second friction elements operable between engaged and disengaged positions on working fluid pressures applied thereto, each of the second friction elements having a rotary member fixed with the casing in the engaged position, and a hydraulic circuit connected to apply working fluid pressures so as to operate selected ones of the friction elements in the engaged position and release the working fluid pressure so as to operate selected ones of the friction elements in the disengaged position.

According to the invention, the fluid pressure control apparatus comprises a control unit for controlling the working fluid pressures to the respective friction elements according to a shift from a current gear position to a target gear position, and air exhaust control means for applying the working fluid pressures temporarily to disengaged ones of the friction elements to exhaust air from the hydraulic circuit. Therefore, the automatic transmission can operate without friction element operation lag, unstable fluid pressure and unstable fluid pressure response which may result from air bubbles collected in the hydraulic circuit.

Preferably, the control unit includes shift valves operable for controlling the working fluid pressures to the friction elements, and the air exhaust control means includes means for operating the shift valves to effect a temporary shift from the current gear position to another gear position so as to apply the working fluid pressures temporarily to the disengaged friction elements. Therefore, the air exhaust control program can be built in the shift control program with the common use of the control actuators (shift valves).

Preferably, the hydraulic circuit includes direct-acting valves operable for controlling the working fluid pressures to the respective friction elements separately, and the air exhaust control means includes means for operating the direct-acting valves to apply the working fluid pressures temporarily to the disengaged friction elements. It is, therefore, possible to exhaust air from the hydraulic circuit in a great degree of freedom.

Preferably, the air exhaust control means includes means for exhausting air from the hydraulic circuit when the vehicle is at rest. It is, therefore, possible to exhaust air from the hydraulic circuit with almost no shock.

Preferably, the air exhaust control means includes means for exhausting air from the hydraulic circuit when the vehicle is running. It is, therefore, possible to elongate the air exhaust control.

Preferably, the air exhaust control means includes means for exhausting air during a shift from a current gear position to a target gear position. Although a shock occurs during the air exhaust control, the shock is inconspicuous. Preferably, the air exhaust control means includes means for exhausting air before the first shift effected after the engine starts. It is, therefore, possible to exhaust the air bubbles corrected while the vehicle is left alone before the first shift effected after the engine starts.

Preferably, the air exhaust control means includes means for repeating a momentary time of application of the working fluid pressure to the disengaged friction elements at time intervals to exhaust air from the hydraulic circuit. It is, therefore, possible to exhaust air from the hydraulic circuit without stroking the piston.

Preferably, the control unit includes means for sensing a temperature of the working fluid, and wherein the air exhaust control means includes means for increasing the momentary time as the sensed working fluid temperature decreases, and means for increasing the time interval as the working fluid temperature decreases. It is, therefore, possible to improve the air exhaust performance to a greater extent as the oil temperature decreases.

What is claimed is:

1. A fluid pressure control apparatus for use with an automotive vehicle including and engine and an automatic transmission having a casing, a plurality of first fiction elements operable between engaged and disengaged positions on pressures of working fluid applied thereto, each of the first friction elements having two rotary members engaged with each other in the engaged position, a plurality of second friction elements operable between engaged and disengaged positions on working fluid pressures applied thereto, each of the second friction elements having a rotary member fixed with the casing in the engaged position, and a hydraulic circuit connected to apply working fluid pressures so as to operate selected ones of the friction elements in the engaged position and release the working fluid pressure so as to operate selected ones of the friction elements in the disengaged position, comprising:

a control unit for controlling the wording fluid pressures to the respective friction elements according to a shift from a current gear position to a target gear position; and air exhaust control means for applying the working fluid pressures temporarily to disengaged ones of the friction elements to exhaust air from the hydraulic circuit.

2. The fluid pressure control apparatus as claimed in claim 1, wherein the air exhaust control means includes means for exhausting air from the hydraulic circuit when the vehicle is at rest.

3. The fluid pressure control apparatus as claimed in claim 2, wherein the air exhaust control means includes means for exhausting air before the first shift effected after the engine starts.

4. The fluid pressure control apparatus as claimed in claim 3, wherein the air exhaust control means includes means for repeating a momentary time of application of the working fluid pressure to the disengaged friction elements at time intervals to exhaust air from the hydraulic circuit.

5. The fluid pressure control apparatus as claimed in claim 4, wherein the control unit includes means for sensing a temperature of the working fluid, and wherein the air exhaust control means includes means for increasing the momentary time as the sensed working fluid temperature decreases, and means for increasing the time interval as the working fluid temperature decreases.

6. The fluid pressure control apparatus as claimed in claim 1, wherein the air exhaust control means includes means for exhausting air from the hydraulic circuit when the vehicle is running.

7. The fluid pressure control apparatus as claimed in claim 6, wherein the air exhaust control means includes means for exhausting air before the first shift effected after the engine starts.

8. The fluid pressure control apparatus as claimed in claim 7, wherein the air exhaust control means includes means for repeating a momentary time of application of the working fluid pressure to the disengaged friction elements at time intervals to exhaust air from the hydraulic circuit.

9. The fluid pressure control apparatus as claimed in claim 8, wherein the control unit includes means for sensing a temperature of the working fluid, and wherein the air exhaust control means includes means for increasing the momentary time as the sensed working fluid temperature decreases, and means for increasing the time interval as the working fluid temperature decreases.

10. The fluid pressure control apparatus as claimed in claim 1, wherein the air exhaust control means includes means for exhausting air during a shift from a current gear position to a target gear position.

11. The fluid pressure control apparatus as claimed in claim 10, wherein the air exhaust control means includes means for exhausting air before the first shift effected after the engine starts.

12. The fluid pressure control apparatus as claimed in claim 11, wherein the air exhaust control means includes means for repeating a momentary time of application of the working fluid pressure to the disengaged friction elements at time intervals to exhaust air from the hydraulic circuit.

13. The fluid pressure control apparatus as claimed in claim 12, wherein the control unit includes means for sensing a temperature of the working fluid, and wherein the air exhaust control means includes means for increasing the momentary time as the sensed working fluid temperature decreases, and means for increasing the time interval as the working fluid temperature decreases.

14. The fluid pressure control apparatus as claimed in claim 1, wherein the air exhaust control means includes means for exhausting air before the first shift effected after the engine starts.

15. The fluid pressure control apparatus as claimed in claim 14, wherein the air exhaust control means includes means for repeating a momentary time of application of the working fluid pressure to the disengaged friction elements at time intervals to exhaust air from the hydraulic circuit.

16. The fluid pressure control apparatus as claimed in claim 15, wherein the control unit includes means for sensing a temperature of the working fluid, and wherein the air exhaust control means includes means for increasing the momentary time as the sensed working fluid temperature decreases, and means for increasing the time interval as the working fluid temperature decreases.

17. The fluid pressure control apparatus as claimed in claim 1, wherein the control unit includes shift valves operable for controlling the working fluid pressures to the friction elements, and wherein the air exhaust control means includes means for operating the shift valves to effect a temporary shift from the current gear position to another gear position so as to apply the working fluid pressures temporarily to the disengaged friction elements.

18. The fluid pressure control apparatus as claimed in claim 17, wherein the air exhaust control means includes means for exhausting air from the hydraulic circuit when the vehicle is at rest.

19. The fluid pressure control apparatus as claimed in claim 17, wherein the air exhaust control means includes means for exhausting air from the hydraulic circuit when the vehicle is running.

20. The fluid pressure control apparatus as claimed in claim 17, wherein the air exhaust control means includes means for exhausting air during a shift from a current gear position to a target gear position.

21. The fluid pressure control apparatus as claimed in claim 17, wherein the air exhaust control means includes means for exhausting air before the first shift effected after the engine starts.

22. The fluid pressure control apparatus as claimed in claim 21, wherein the air exhaust control means includes means for repeating a momentary time of application of the working fluid pressure to the disengaged friction elements at time intervals to exhaust air from the hydraulic circuit.

23. The fluid pressure control apparatus as claimed in claim 22, wherein the control unit includes means for sensing a temperature of the working fluid, and wherein the air exhaust control means includes means for increasing the momentary time as the sensed working fluid temperature decreases, and means for increasing the time interval as the working fluid temperature decreases.

24. The fluid pressure control apparatus as claimed in claim 1, wherein the hydraulic circuit includes direct-acting valves operable for controlling the working fluid pressures to the respective friction elements separately, and wherein the air exhaust control means includes means for operating the direct-acting valves to apply the working fluid pressures temporarily to the disengaged friction elements.

25. The fluid pressure control apparatus as claimed in claim 24, wherein the air exhaust control means includes means for exhausting air from the hydraulic circuit when the vehicle is at rest.

26. The fluid pressure control apparatus as claimed in claim 24, wherein the air exhaust control means includes means for exhausting air from the hydraulic circuit when the vehicle is running.

27. The fluid pressure control apparatus as claimed in claim 24, wherein the air exhaust control means includes means for exhausting air during a shift from a current gear position to a target gear position.

28. The fluid pressure control apparatus as claimed in claim 24, wherein the air exhaust control means includes means for exhausting air before the first shift effected after the engine starts.

29. The fluid pressure control apparatus as claimed in claim 28, wherein the air exhaust control means includes means for repeating a momentary time of application of the working fluid pressure to the disengaged friction elements at time intervals to exhaust air from the hydraulic circuit.

30. The fluid pressure control apparatus as claimed in claim 29, wherein the control unit includes means for sensing a temperature of the working fluid, and wherein the air exhaust control means includes means for increasing the momentary time as the sensed working fluid temperature decreases, and means for increasing the time interval as the working fluid temperature decreases.

* * * * *